UNITED STATES PATENT OFFICE.

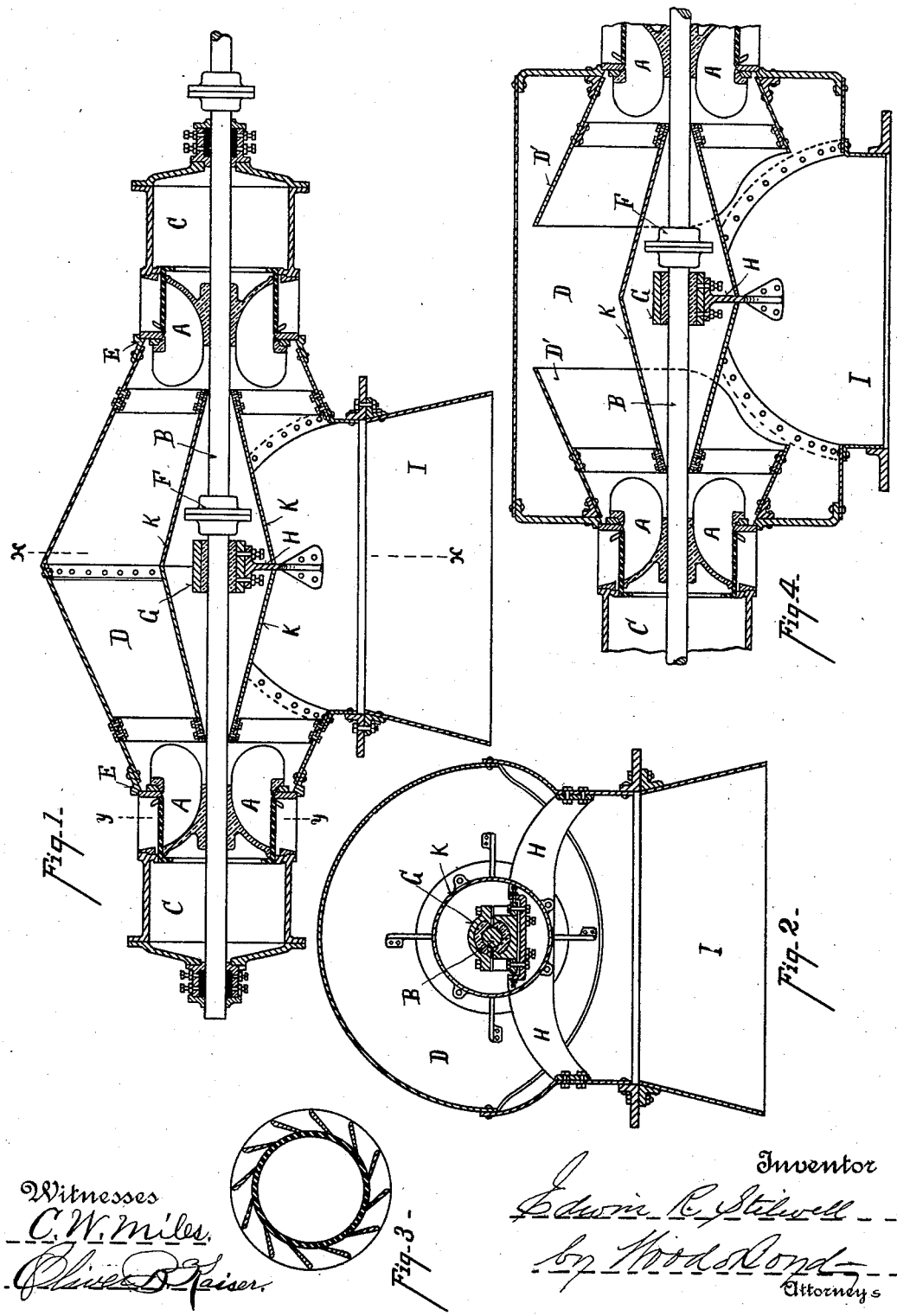

EDWIN R. STILWELL, OF DAYTON, OHIO, ASSIGNOR TO THE STILWELL-BIERCE & SMITH-VAILE COMPANY.

DUPLEX WATER-WHEEL VORTEX-CHAMBER.

SPECIFICATION forming part of Letters Patent No. 582,962, dated May 18, 1897.

Application filed November 5, 1896. Serial No. 611,157. (No model.)

*To all whom it may concern:*

Be it known that I, EDWIN R. STILWELL, residing at Dayton, in the county of Montgomery and State of Ohio, have invented certain new and useful Improvements in Duplex Water-Wheel Vortex-Chambers, of which the following is a specification.

The object of my invention is to construct the vortex-chamber which receives the water of two water-wheels of such shape or dimensions that the water from the two wheels will be reduced in velocity in the vortex-chamber and the two currents given such direction as to prevent them from reducing the force of the water acting on the water-wheels, and the water will be gradually and evenly turned from a horizontal direction into a vertically-discharging draft-tube.

Another object of my invention is to provide a deflecting-pipe arranged around the water-wheel shaft to assist in reducing the velocity and momentum of the water, also to serve as a cover for the pedestal box and coupling.

The features of my invention will be more fully set forth in the description of the accompanying drawings, making a part of this specification, in which—

Figure 1 is a longitudinal central vertical section of my improvement in position for use. Fig. 2 is a section on line *x x*, Fig. 1. Fig. 3 is a section on line *y y*, Fig. 1. Fig. 4 is a modification of Fig. 1.

A A represent water-wheels secured to a common shaft B.

C represents the outer end of the water-wheel casing.

D represents a vortex-chamber of the preferred form of construction, which is that of two frustums of cones connected together, and the smaller ends of the same connected to the inner end E of each of the respective wheel-cases.

F represents shaft-coupling; G, the shaft, bearing supported upon the bridge-tree H.

I represents a common discharge or draft tube, out of which the water is discharged from the vortex-chamber.

K represents a conical casing, which is preferably of the same shape as the vortex-chamber and placed around the water-wheel shaft and occupying a small central section of the vortex-chamber. As the water is discharged from the water-wheels in a series of conical sheets it is delivered into a passage formed between two conical pipes, which diverge so as to form a gradually-enlarging area. As the water fills this area its velocity and momentum are reduced and the power which was in it is used to drive the water-wheel by sucking the water through it with increased velocity. At the same time, reducing the velocity reduces the opposition of the two currents to each other, so that the water is more easily turned from a horizontal to a vertical direction.

In the modification shown in Fig. 4 I have shown the vortex-chamber as formed of a cylinder secured to the case of the water-wheel deflecting-cones D', which form the inner end of the wheel-casing, so as to carry the water more toward the center of the vortex-chamber opposite the draft-tube I.

The two methods of constructing the vortex-chamber are practically the same, that of Fig. 1 being preferred.

Having described my invention, I claim—

1. In combination with two water-wheels mounted upon a common horizontal shaft, with their discharge ends placed toward each other, a vortex-chamber connected to the respective water-wheel casings having a gradually-enlarging area from said casings outward toward the center thereof, and a draft-tube centrally connected to said vortex-chamber, substantially as specified.

2. In combination with two water-wheels placed upon a common shaft discharging water toward each other, a vortex-chamber composed of two frustums of cones connected together and to the wheel-casing, substantially as specified.

3. In combination with two water-wheels placed upon a common shaft discharging the water toward each other, a vortex-chamber composed of two frustums of cones connected together and to the wheel-casing, and a draft-tube I centrally connected to said vortex-chamber, substantially as specified.

4. The combination with two water-wheels placed upon a common shaft and discharging their water toward each other, of an enlarged vortex-chamber having central openings at each end within which the respective wheels revolve, a common draft-tube I centrally connected thereto, and a casing K spanning the central portion of the shaft and bearing, substantially as specified.

5. In combination with two water-wheels placed upon a common shaft discharging their water toward each other, a vortex-chamber composed of two frustums of cones connected together and to the wheel-casing, casing K of similar shape to the vortex-chamber, and located around the shaft centrally within said vortex-chamber, substantially as specified.

6. In combination with two water-wheels placed upon a common shaft discharging the water toward each other, a vortex-chamber composed of two frustums of cones connected together and to the wheel-casing, a bridge-tree connected to the walls of said vortex-chamber and supporting the central shaft-bearing, substantially as specified.

In testimony whereof I have hereunto set my hand.

EDWIN R. STILWELL.

Witnesses:
W. R. WOOD,
OLIVER B. KAISER.